US008176340B2

(12) United States Patent
Tripathi et al.

(10) Patent No.: US 8,176,340 B2
(45) Date of Patent: May 8, 2012

(54) METHOD AND SYSTEM FOR INITIALIZING AN INTERFACE BETWEEN TWO CIRCUITS OF A COMMUNICATION DEVICE WHILE A PROCESSOR OF THE FIRST CIRCUIT IS INACTIVE AND WAKING UP THE PROCESSOR THEREAFTER

(75) Inventors: Nandan Tripathi, Noida (IN); Rahul Garg, Faridabad (IN); Vivek Goel, Noida (IN); Rajan Kapoor, Faridabad (IN); Sachin Prakash, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 1129 days.

(21) Appl. No.: 12/025,753

(22) Filed: Feb. 5, 2008

(65) Prior Publication Data

US 2008/0186146 A1    Aug. 7, 2008

(30) Foreign Application Priority Data

Feb. 6, 2007    (IN) .............................. 235/DEL/2007

(51) Int. Cl.
  *G06F 1/00*    (2006.01)
(52) U.S. Cl. ..................................... 713/300; 340/10.33
(58) Field of Classification Search .................. 713/300; 455/553.1; 340/10.33
  See application file for complete search history.

(56) References Cited

U.S. PATENT DOCUMENTS 5,365,225 A    11/1994    Bachhuber
6,735,142 B1    5/2004    Oh
6,886,105 B2    4/2005    Kahn et al.
7,072,989 B1    7/2006    Kolokowsky et al.
7,287,175 B2    10/2007    Vereen et al.
7,587,222 B2*    9/2009    Trachewsky et al. ...... 455/553.1
2001/0021981 A1*    9/2001    Konaka et al. ................ 713/300
2003/0188212 A1    10/2003    Kahn et al.
2005/0182977 A1*    8/2005    Powers et al. ................. 713/300
2005/0281320 A1    12/2005    Neugebauer
2006/0029103 A1*    2/2006    Riess ............................ 370/484
2006/0041696 A1    2/2006    Cherukuri et al.
2006/0045031 A1*    3/2006    Hickey et al. ................. 370/266

FOREIGN PATENT DOCUMENTS

JP    8016405 A    1/1996

* cited by examiner

*Primary Examiner* — Thomas Lee
*Assistant Examiner* — Xuxing Chen
(74) *Attorney, Agent, or Firm* — Charles Bergere

(57) ABSTRACT

A method and system for managing communications between sub-systems of a communication device. The sub-systems include a Radio Frequency Integrated Circuit (RFIC) and a Baseband Integrated Circuit (BBIC). The BBIC includes a processing engine, a state machine module and an interface module. The method includes initializing a Digital Radio Frequency Third Generation (DigRF3G) interface between the RFIC and the BBIC. The processing engine is kept functionally inactive during the initialization process of the DigRF3G interface. Further, the method includes exchanging one or more packets between the RFIC and the BBIC.

10 Claims, 5 Drawing Sheets

METHOD AND SYSTEM FOR INITIALIZING AN INTERFACE BETWEEN TWO CIRCUITS OF A COMMUNICATION DEVICE WHILE A PROCESSOR OF THE FIRST CIRCUIT IS INACTIVE AND WAKING UP THE PROCESSOR THEREAFTER

BACKGROUND OF THE INVENTION

The present invention relates generally to sub-systems in electronic devices, and more specifically, to a method and system for managing communications between sub-systems in communication devices.

Communication device transceivers generally have three sub-systems, namely a Radio Frequency Integrated Circuit (RFIC), a mixed signal integrated circuit and a Baseband Integrated Circuit (BBIC). Recently, advancements in silicon technology have resulted in a transceiver with only two sub-systems, an RFIC and a BBIC. The RFIC and the BBIC exchange data and control signals through a digital interface. In the field of mobile communications, a consortium named as 'Digital Radio Frequency' (DigRF) has been formed, which specifies various sub-system interfaces in communication devices. The DigRF consortium has also added an interface of third generation Radio Frequency (RF) components and the BBIC known as 'Digital Radio Frequency Third Generation' (DigRF3G) interface. The DigRF3G standard defines the digital interface and the data transfer functionality in third generation communication devices.

In mobile communication systems such as Global System for Mobile Communications (GSM), Enhanced General Packet Radio Service (EGPRS) and Universal Mobile Telecommunications System (UMTS), the paging channel is used by a base station to transmit a message to a communication device to indicate that there are incoming data packets. When the communication device is not in use, it enters a sleep mode. While in the sleep mode, the communication device periodically wakes up to monitor the paging channel. The sleep mode of the communication device helps conserve power. The exit of the communication device from the sleep mode requires establishing a link through a handshaking sequence of control frames between the RFIC and the BBIC.

In a typical communication device, entry and exit from sleep mode is accomplished by a low power sequencer present in the communication device. The low power sequencer is a digital circuit, which is useful in synchronization of various processes in the communication device. In present communication systems, a low power sequencer turns on the processing engine (core or main processor) in the BBIC. Subsequently, the processing engine initializes the interface between the RFIC and the BBIC. This processing engine is the most power consuming component in the BBIC. Therefore, participation of the processing engine during the initialization of the DigRF3G interface causes large power dissipation.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE PRESENT INVENTION

Figure 1:
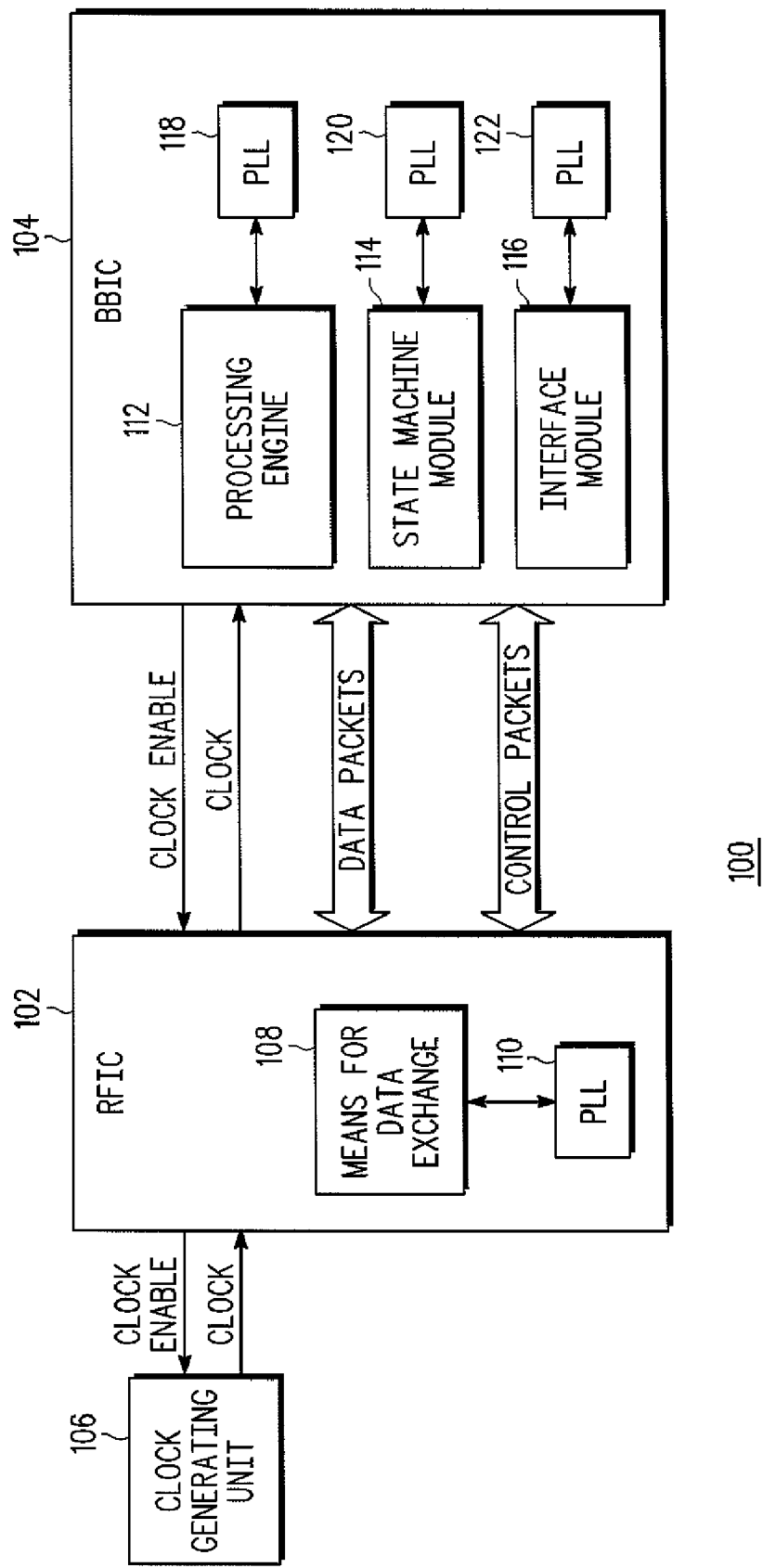
FIG. 1 is a schematic block diagram delineating exemplary constituents of an RFIC and a BBIC in a communication device in accordance with an embodiment of the present invention.

The detailed description, in connection with the appended drawings, is intended as a description of the presently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for managing communication between sub-systems of a communication device is provided. The sub-systems of the communication device are a Radio Frequency Integrated Circuit (RFIC) and a Baseband Integrated Circuit (BBIC). The method includes initializing a Digital Radio Frequency Third Generation (DigRF3G) interface between the RFIC and the BBIC. During the initialization, a processing engine of the BBIC remains functionally inactive. Further, the method includes exchanging one or more data packets between the RFIC and the BBIC based on the initialization of the DigRF3G interface.

In another embodiment of the present invention, a system for managing communications between sub-systems of a communication device is provided. The sub-systems of the communication device include a BBIC and a RFIC. The BBIC includes a processing engine. Each of the BBIC and the RFIC include one or more Phase Locked Loops (PLLs). The system includes a state machine module that has a plurality of states. The state machine module updates its state based on one or more predefined conditions. Each of these plurality of states is used to manage the communications between the sub-systems of the communication device. Further, the system includes an interface module. The interface module is connected to the state machine module. The interface module generates signals to initialize a communication interface between the RFIC and the BBIC.

In yet another embodiment of the present invention, a communication device is provided. The communication device includes an RFIC and a BBIC. The BBIC processes one or more data packets. The BBIC includes a processing engine, a state machine module and an interface module. The processing engine processes the one or more data packets to be used in the communication device. The state machine module has a plurality of states. The state machine module updates its state based on one or more predefined conditions. The interface module is connected to the state machine module. The interface module generates a plurality of signals to facilitate communications between the BBIC and RFIC. The plurality of signals is generated based on a corresponding state of the plurality of states of the state machine module.

Various embodiments of the present invention provide a method and system for managing communications between sub-systems of a communication device. The present invention provides initialization of the interface between the sub-systems according to the DigRF3G standard. The present invention provides a method for initialization of DigRF3G interface without activating the processing engine of the BBIC during the initialization process. Therefore, the present invention provides a significant power saving during the initialization of DigRF3G interface by keeping the processing engine functionally inactive.

Referring now to FIG. 1, a schematic block diagram illustrating various sub-systems of a communication device 100 is shown, in accordance with an embodiment of the present invention. The communication device 100 may be a multi-mode 3G mobile phone. 3G mobile phones generally comply with Wideband Code Division Multiple Access (W-CDMA), cdma2000, High-Speed Downlink Packet Access (HSDPA), and Universal Mobile Telecommunications System (UMTS). Other examples of the communication device 100 include, but are not limited to, multimode 2G mobile phones (complying with Global System for Mobile Communications, Integrated Digital Enhanced Network (iDEN), and the like), pagers, global positioning systems, cordless telephone sets and two way radios.

The communication device 100 includes an RFIC 102 and a BBIC 104. In a typical communication device 100, the RFIC 102 transmits and receives data to and from external communication devices through a transmission link. The RFIC 102 also receives data packets from the BBIC 104, which it transmits to the external communication devices. The BBIC 104 exchanges data packets with the RFIC 102 for appropriate data processing. The BBIC 104 performs numerous signals processing operations at baseband frequencies. These operations include encoding/decoding, (de)modulation and (de)interleaving functions and the like.

Each of the RFIC 102 and the BBIC 104 has transceiver interfaces. The communication device 100 has a BBIC-RFIC physical interface. The transceiver interfaces include data receive (RX) as well as data transmit (TX) interfaces. The exchange of data packets between the RFIC 102 and the BBIC 104 requires initialization of a DigRF3G interface. In an embodiment of the present invention, initialization of the DigRF3G interface is facilitated by a handshaking sequence of control packets between the RFIC 102 and the BBIC 104. The RFIC 102 and BBIC 104 can be coupled to numerous other sub-systems (not shown in FIG. 1) performing functions such as signal processing, amplifying, and storage.

FIG. 1 also shows exemplary constituents of the RFIC 102 and the BBIC 104. A clock generating unit 106 is connected to the RFIC 102. The clock generating unit 106 generates a clock signal that is used for the functioning of the RFIC 102 and the BBIC 104. The RFIC 102 includes a means for data exchange 108 and a Phase Lock loop (PLL) 218. The means for data exchange 108 facilitates the exchange of data packets between the RFIC 102 and the BBIC 104. Other signals used in the communication device 100 are the control packets. In an embodiment of the present invention, the control packets are generated by the BBIC 104. The means for data exchange 108 exchanges the data packets with the BBIC 104 depending upon the handshaking sequence of the control packets. Components of the means for data exchange 108 can be RF transceivers, RF to Baseband conversion circuits, PLLs, and BBIC control interface circuits. The PLL 110 generates a high frequency clock signal from a low frequency clock signal generated by the clock generating unit 106. It will be apparent to a person skilled in the art that the RFIC 102 includes other components (not shown in FIG. 1) such as RF antennas, RF mixers, RF couplers, RF amplifiers, and modulating and demodulating circuits to exchange data with external communication devices.

The BBIC 104 includes a processing engine 112, a state machine module (SMM) 114, an interface module 116 and one or more PLLs. In the embodiment shown, three PLLs are shown, 118, 120 and 122. The processing engine 112 is a central baseband processor of the BBIC 104. The processing engine 112 processes the data packets. Examples of processors generally include, but are not limited to, a digital signal processor and RISC processors, such as the MXC91321 available from Freescale Semiconductor, Inc. of Austin, Tex. The PLL 118 is operatively coupled with the processing engine 112. Similarly, the PLLs 120 and 122 are operatively coupled with the SMM 114 and the interface module 116 respectively.

The SMM 114 is a finite state machine. Examples of the SMM 114 include digital circuits such as flip-flops, latches, registers, counters and the combinations thereof. The SMM 114 transitions between a plurality of states. The SMM 114 changes state based on one or more predefined conditions. The predefined conditions include waking up of the SMM 114, stabilizing of a clock signal generated by the clock generating unit 106, stabilizing conditions of the PLLs 118, 120, 122 and 110, and one or more time constraints imposed by a timer (not shown) in the BBIC 104, where the timer is coupled with the SMM 114.

The interface module 116 provides connections for data and control packets passed between the RFIC 102 and the BBIC 104 by establishing a DigRF3G interface. The interface module 116 generates a plurality of signals to initialize the DigRF3G interface. Each of these signals is generated based on a corresponding state of the SMM 114. During the initialization process of the DigRF3G interface, the interface module 116 ensures that the processing engine 112 is functionally inactive. The processing engine 112 is active only after the completion of an interface establishment, which is performed by the interface module 116 in coordination with the SMM 114. It will be understood by a person skilled in the art that the above described process of the initialization of the DigRF3G interface can be applied to initialize other interfaces such as DigRF2G and the like.

As previously discussed, the RFIC 102 and the BBIC 104 communicate via the DigRF3G interface, where one or more data packets are exchanged between the RFIC 102 and the BBIC 104. During initialization, the processing engine 112 is inactive. In other words, the processing engine 112 is idle during the initialization process.

Figure 2:
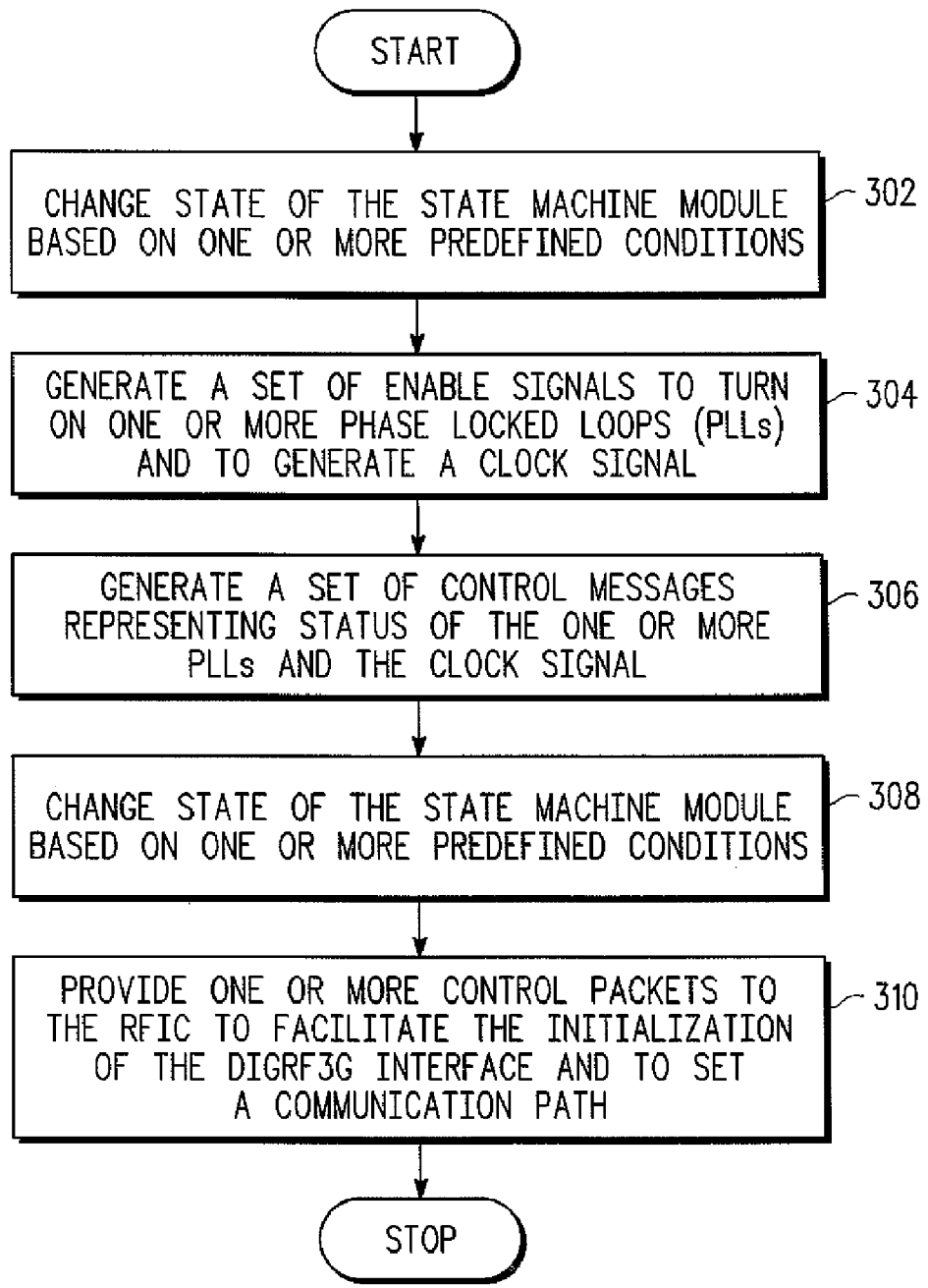
FIG. 2 is a flowchart of a method for managing communications between sub-systems of a communication device in accordance with an embodiment of the present invention.

Referring now to FIG. 2, a flowchart illustrating initialization of the DigRF3G interface in accordance with an embodiment of the present invention is shown. At step 302, state of the SMM 114 is changed based on the predefined conditions. For example, at step 302, the first change of state in the states of the SMM 114 takes place when the SMM 114 wakes up. At step 304, a set of control signals is generated to initialize the DigRg3G interface. The generated control signals correspond to a state of the plurality of states of the SMM 114. For example, a set of enable signals is generated to turn ON the PLLs 118, 120, 122 (PLL 110 is turned on with a control message), and to generate a clock signal. At step 306, a set of control messages is generated. These control messages are used to bring the interface to a certain speed, stabilize the interface, and instruct the RFIC 102 to start receiving data. In short, these control signals are used to establish the interface. After step 306, step 308 is performed. Step 308 is like step 302, it is a change of state of the SMM 114 based in correspondence with the stabilizing conditions of the PLLs 118, 120, 122 and 110 and the clock signal. It should be understood that the set of control messages is generated based on a present state of the SMM 114. Step 310 is similar to step 306. At step 310, the BBIC 104 provides one or more control packets to the RFIC 102. These control packets facilitate the initialization of the DigRF3G interface.

Figure 3:
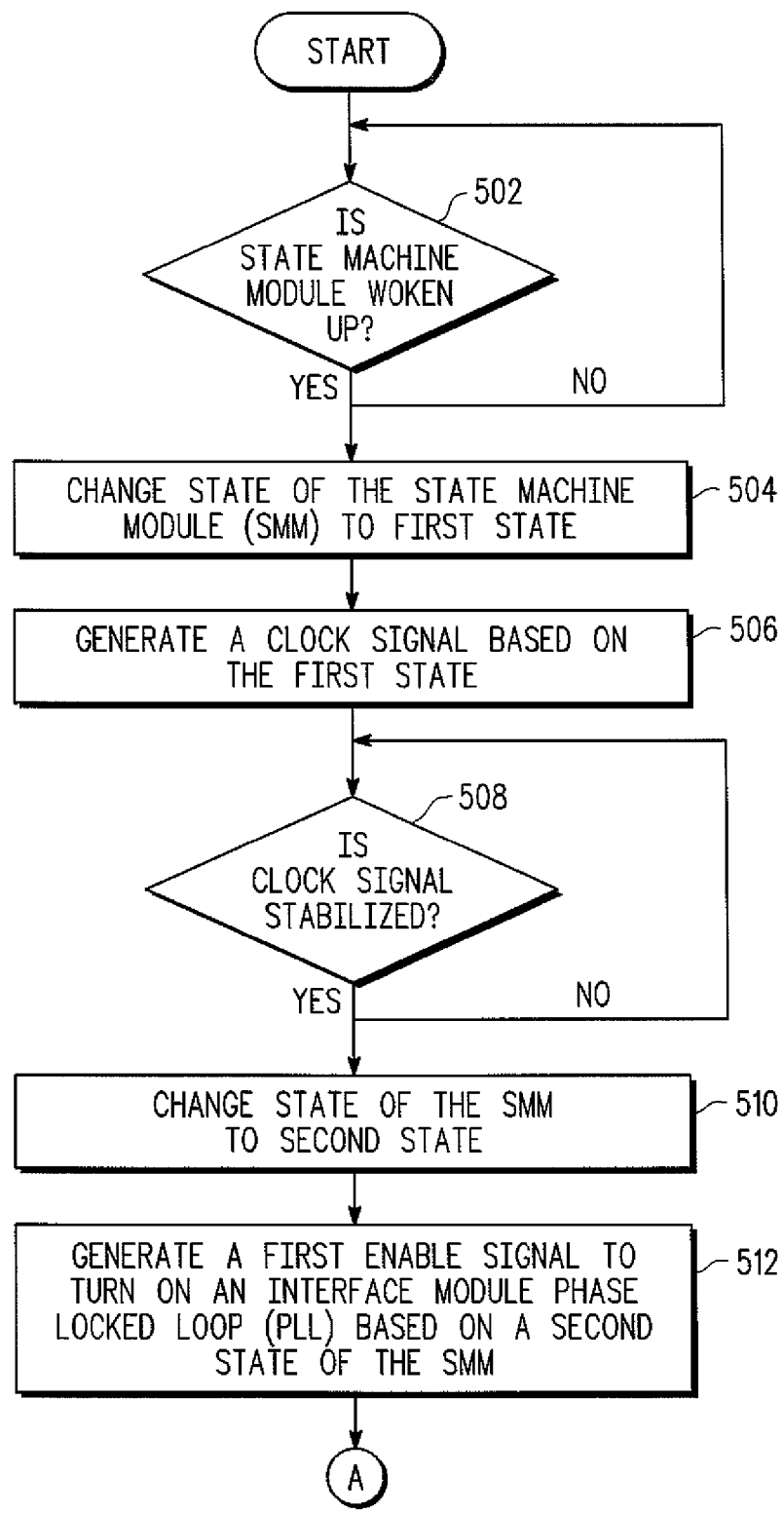
FIGS. 3 and 4 are a flowchart illustrating a detailed flow diagram for managing communication between sub-systems of a communication device in accordance with an embodiment of the present invention.
Figure 4:
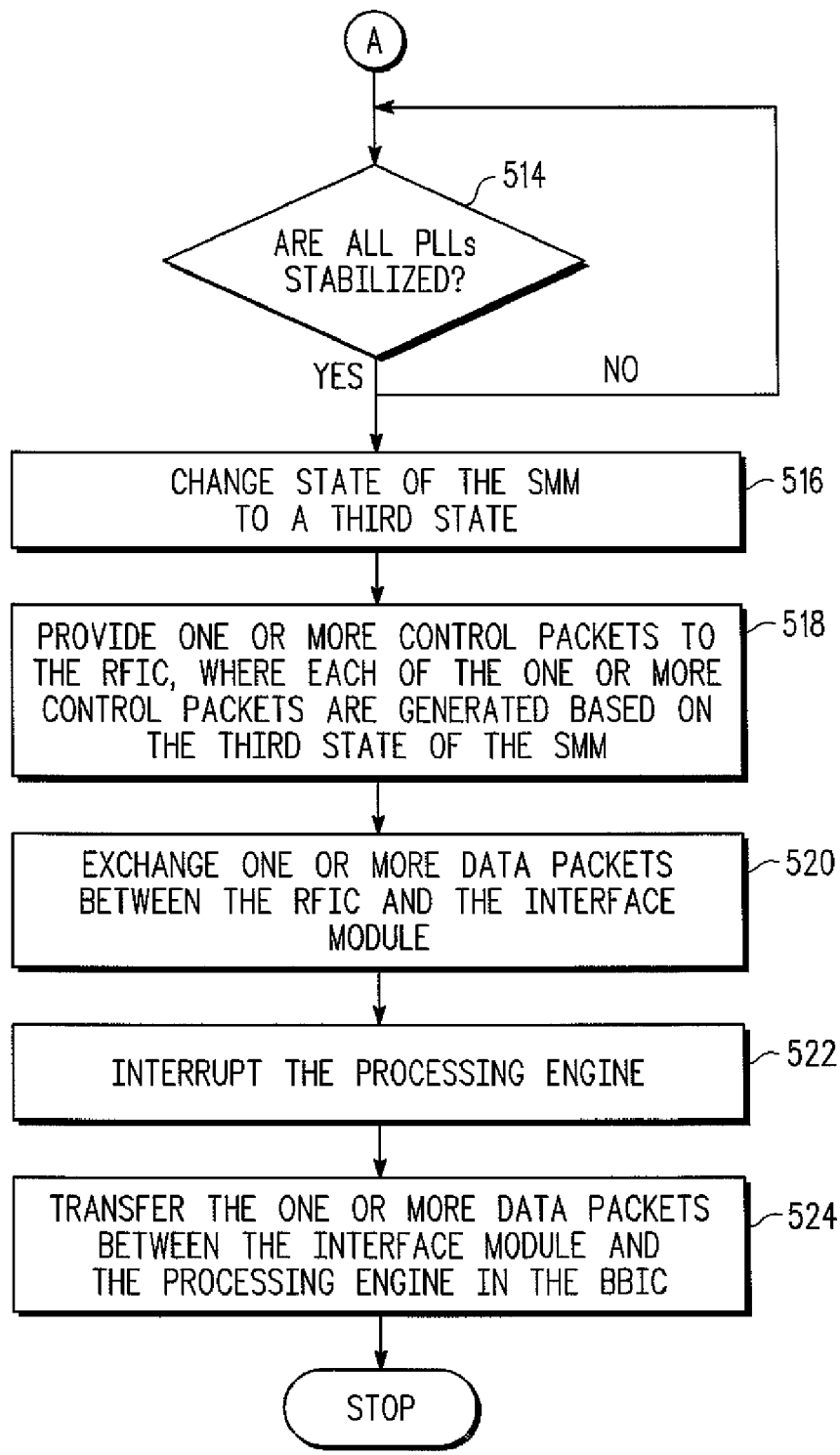

FIGS. 3 and 4 are a flowchart for explaining the managing of communications between the RFIC 102 and the BBIC 104, in accordance with an embodiment of the present invention. At step 502, a periodic check is performed on the SMM 114. This periodic check is done in order to monitor the paging channel. When the SMM 114 comes out of the sleep mode, step 504 is executed. In one embodiment of the present invention, the SMM 114 comes out of the sleep mode after expiration of a sleep timer. At step 504, the SMM 114 changes state to indicate that it is active, such as by generating an asserting signal. The asserting signal is also used to enable the clock generating unit 106 to start functioning. At step 506, the clock generating unit 106 generates a clock signal that is provided to the BBIC 104. A typical clock generating unit 106 takes a finite amount of time to stabilize the generated clock signal. At step 508, the condition of the clock signal is checked to determine if the clock signal is stable. More specifically, expiration of a pre-programmed timer indicates that the clock is stable. Subsequently, at step 510, the SMM 114 changes state to a second state of the plurality of states, which indicates that the clock signal has stabilized. The second state of the SMM 114 indicates a stable clock signal, which in turn generates a first control message of the set of control messages. The first control message is provided to the interface module 116 to turn ON the PLL 110.

At step 512, a first enable signal of the set of enable signals is generated. The first enable signal is provided to the PLLs 118, 120 and 122 and the first control packet of the one or more control packets is sent to the RFIC 102 to activate the PLL 110. At step 514, a stabilizing condition of the PLLs 118, 120, 122 and 110 is checked (such as via expiration of a pre-programmed timer). Step 516 is executed only after PLLs 118, 120, 122 and 110 are stable. In an embodiment of the present invention, a PLL stabilizing timer is used to check the stabilization condition of PLLs 118, 120, 122 and 110. In other words, step 516 is executed after the expiry of the PLL stabilizing timer. At step 516, the SMM 114 changes state to a third state, which indicates a stabilizing condition of the PLLs 118, 120, 122 and 110. At step 518, a additional control packets of the one or more control packets are generated by the interface module 116 based on the third state of the SMM 114. These additional control packets are provided to the RFIC 102. The additional control packets set the interface at high speed and enable the data receive (RX) interface of the RFIC 102.

Subsequently, the RFIC 102 begins receiving data packets from other communication devices. Further, the interface module 116 activates its own RX interface. In an embodiment of the present invention, the interface module 116 sets its RX interface at high speed. At step 520, the RFIC 102 receives data packets from an external communication device. The RFIC 102 sends the data packets to the interface module 116.

At step 522, the interface module 116 interrupts the processing engine 112. Note that the processing engine 112 is functionally inactive until step 522. The inactive state of the processing engine 112 leads to significant power savings. At step 524, the interface module 116 transfers the data packets to the processing engine 112. Thereafter, a standard communication path is established between the RFIC 102 and the processing engine 112.

Figure 5:
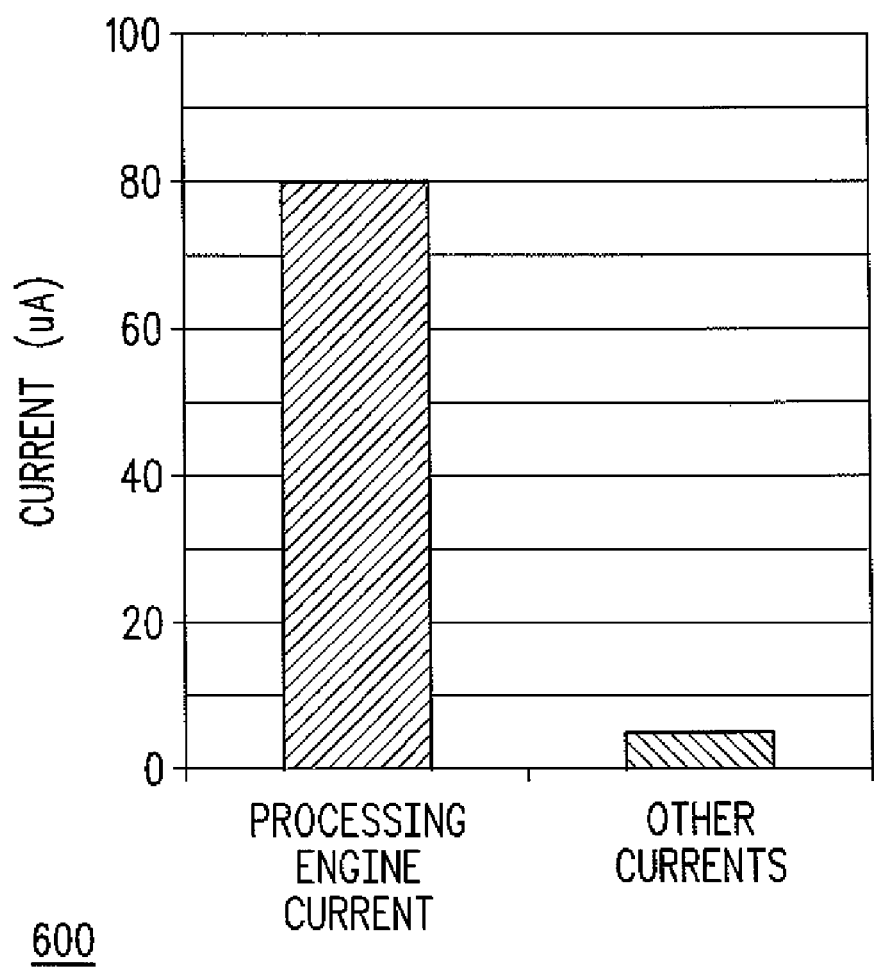
FIG. 5 is a graph illustrating power consumption during DigRF3G interface initialization in a communication device.

Referring now to FIG. 5, a graph 600 illustrating power consumption during DigRF3G interface initialization in the communication device 100 is shown, in accordance with an embodiment of the present invention. The graph 600 shows the current in the processing engine 112 versus the current in the other sub-systems during the initialization of the DigRF3G interface. The unit of current used in the graph 600 is microamperes (μa). The processing engine current is a current consumed by the processing engine 112. The other currents include the current of the interface module 116, SMM 114 and the current flowing in the PLLs 118, 120, 122 and 110. As shown in the graph 600, the value of the processing engine current is 80 μa whereas the other currents are 5 μa. Therefore it can be deduced that the total current in the communication device 100 is about 85 μa when the processing engine 112 is active, and the total current is 5 μa in case the processing engine 112 is inactive, such as during the initialization process. The power consumption in a device is directly proportional to the square of current in the device. Hence, a significant power saving is achieved by the present invention.

The invention claimed is:

1. A method for managing communications between sub-systems of a communication device, the sub-systems of the communication device including a Baseband Integrated Circuit (BBIC) and a Radio Frequency Integrated Circuit (RFIC), the BBIC including a processing engine, a state machine module and an interface module, each of the BBIC and the RFIC including one or more Phase Locked Loops (PLLs), the method comprising:

initializing a Digital Radio Frequency Third Generation (DigRF3G) interface between the RFIC and the BBIC, wherein the processing engine is functionally inactive during the initialization;

exchanging one or more data packets between the RFIC and the BBIC based on the initialization of the DigRF3G interface;

waking-up the processing engine after said initializing; and transferring the one or more data packets between the BBIC interface module and the processing engine.

2. The method for managing communications between the sub-systems of the communication device of claim 1, wherein initializing the DigRF3G interface comprises:

updating a state of the state machine module based on one or more predefined conditions, wherein the state machine module transitions between a plurality of states; and generating set of control signals to initialize the DigRF3G interface, wherein each control signal of the set of control signals is generated corresponding to a state of the plurality of states of the state machine module, and wherein each control signal of the set of control signals is provided to at least one of the RFIC and the BBIC.

3. The method for managing communications between the sub-systems of the communication device of claim 2, wherein the one or more predefined conditions include at least one of a waking up of the state machine module, stabilizing of a clock signal in the communication device, stabilizing conditions of the one or more PLLs, and one or more time constraints.

4. The method for managing communications between the sub-systems of the communication device of claim 3, wherein generating the set of control signals comprises:

generating sets of enable signals and control messages to turn ON the one or more PLLs and to generate a clock signal; and providing one or more control packets to the RFIC to facilitate the initializing of the DigRF3G interface and setting a communication path between the RFIC and the BBIC for exchanging the one or more data packets.

5. A system for managing communications between sub-systems of a communication device, the sub-systems of the communication device including a Baseband Integrated Circuit (BBIC) and a Radio Frequency Integrated Circuit (RFIC), the BBIC including a processing engine, each of the BBIC and the RFIC including one or more phase locked loops (PLLs), the system comprising:
  a state machine module that updates its state based on one or more predefined conditions, wherein the state machine module has a plurality of states, and wherein each of the plurality of states is used to manage the communications between the sub-systems; and
  an interface module connected to the state machine module that generates signals to initialize a communication interface between the RFIC and the BBIC,
  wherein the processing engine is inactive while the state machine module initializes the communication between the RFIC and the BBIC and wherein the communication interface includes a Digital Radio Frequency Third Generation (DigRF3G) interface.

6. The system for managing communications of claim 5, further comprising at least one timer coupled with the state machine module, and wherein the one or more predefined conditions include at least one of a waking up of the state machine module, stabilizing of a clock generating unit, stabilizing conditions of the one or more PLLs and one or more time constraints imposed by the at least one timer.

7. A communication device, comprising:
  a radio frequency integrated circuit (RFIC); and
  a baseband integrated circuit (BBIC), coupled to the RFIC, that processes one or more data packets, wherein the BBIC comprises:
    a processing engine that processes the one or more data packets, wherein the processed data packets are intended to be used in the communication device;
    a state machine module, coupled to the processing engine, that updates its state based on one or more predefined conditions, wherein the state machine module has a plurality of states, at least one of said states for initializing communication between the RFIC and the BBIC; and
    an interface module connected to the state machine module that generates a plurality of signals to facilitate communications between the BBIC and RFIC via initializing a communication interface, wherein the plurality of signals are generated based on a corresponding state of the plurality of states, wherein the communication interface is a Digital Radio Frequency Third Generation (DigRF3G) interface, and wherein the processing engine is inactive while the state machine module initializes the communication between the RFIC and the BBIC.

8. The communication device of claim 7, wherein the BBIC further comprises:
  one or more Phase Locked Loops (PLLs), coupled with at least one of the state machine module and the interface module, that facilitate the exchange of the one or more data packets between the RFIC and the BBIC; and
  at least one timer, coupled to the state machine module, that facilitates the initialization of the communication interface.

9. The communication device of claim 7, wherein the RFIC comprises:
  a clock generating unit to generate a clock signal, wherein the clock signal is used for the exchange of the one or more data packets; and
  means for data exchange that exchange the one or more data packets with the BBIC.

10. The communication device of claim 9, wherein the means for data exchange comprises at least one of a RF transceiver, at least one Phase Locked Loop (PLL), Timer circuits, BBIC-RFIC physical interface, and radio Frequency (RF) to Baseband conversion circuits.

* * * * *